Aug. 18, 1931.  G. R. METCALF, JR  1,819,650
CONNECTER
Filed July 16, 1928

George R. Metcalf Jr.
INVENTOR.

BY
ATTORNEYS.

Patented Aug. 18, 1931

1,819,650

UNITED STATES PATENT OFFICE

GEORGE R. METCALF, JR., OF ERIE, PENNSYLVANIA, ASSIGNOR TO ERIE MALLEABLE IRON COMPANY, OF ERIE, PENNSYLVANIA, A CORPORATION OF PENNSYLVANIA

CONNECTER

Application filed July 16, 1928. Serial No. 293,170.

This invention is designed to improve connecters and is exemplified as a conduit fitting adapted for use with a threadless conduit. It is designed to simplify the connection and to make more secure the connection between the fitting and the conduit, or between the members of connecter. Features and details of the invention will appear from the specification and claims.

Preferred embodiments of the invention as exemplified are illustrated in the accompanying drawings as follows:—

Figure 1:
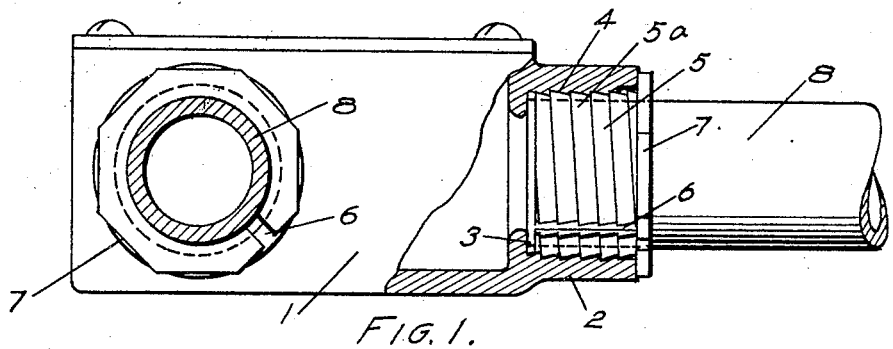

Fig. 1 shows a conduit box, partly in section, illustrative of the invention.

Figure 2:
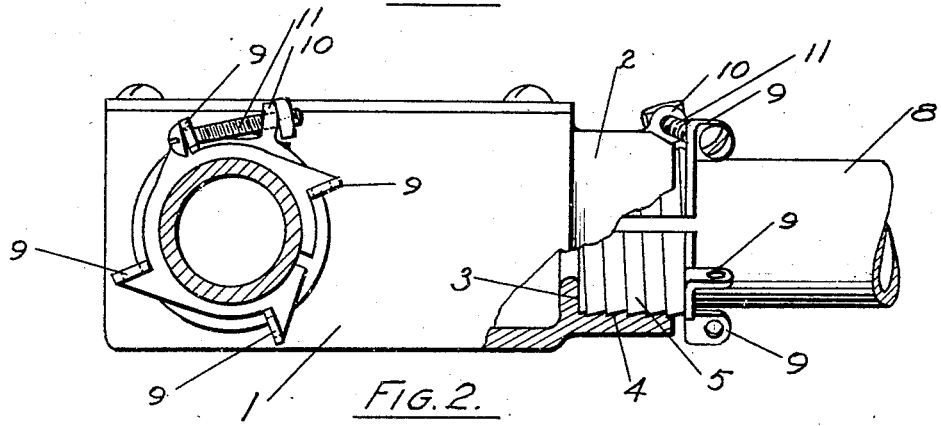

Fig. 2 a similar view with a modification from that shown in Fig. 1.

Figure 3:
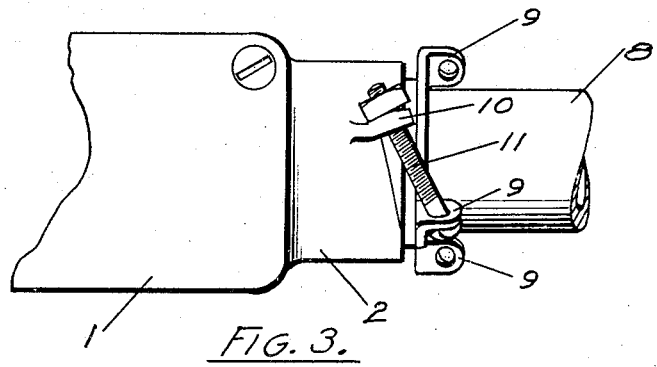

Fig. 3 a plan view of the structure shown in Fig. 2.

1 marks the body of the fitting. This in the particular construction shown has an extension 2 and a guard lip 3.

The extension has a screw thread 4 into which is screwed a sleeve 5. The sleeve 5 is provided with a slot, 6, the outer end of the sleeve being provided with a wrench-hold 7.

The thread 5a on the sleeve and the thread 4 have the slopes of the teeth receiving the thrust as the sleeve is screwed into the opening of less inclination to the axis than to a perpendicular to the axis. The thread is in form similar to the common buttress thread but reversed as to the slopes receiving the thrust. With this structure as the sleeve is screwed up and the shoulder formed by the wrench-hold abuts the end of the body the wedging action of the slopes of the thread 5a against the slopes of the thread 4 contracts the sleeve, thus clamping an inserted conduit 8 in the sleeve. Clamping the conduit directly with the sleeve in this manner strengthens the connection with the conduit in that any pull on the conduit tending to disconnect it from the sleeve exerts endwise pressure on the sleeve, which acting through the wedging surfaces, tends to further contract the sleeve and so increase its clamping action in proportion to the endwise pull of the conduit. This is important in that one of the difficulties with relation to threadless conduit is to form a connection of sufficient strength to assure against loosening of the conduit under strain. Very rigid regulations are in force in most sections with relation to this and this added strength by reason of the wedging action under strain increases the clamping action to a point that will ordinarily satisfy such regulation.

In the structure shown in Figs. 2 and 3 the sleeve 5 abuts the guard lip and this exerts the thrust to contract the sleeve. The sleeve is provided with a series of perforated ears 9 and the body with a perforated ear 10. A bolt 11 extends through the ears and by means of this screw the sleeve 5 may be screwed up, thus giving the initial clamping effect to the sleeve.

What I claim as new is:—

1. In a connecter, the combination of a body sleeve; and a slotted sleeve in the body sleeve, said slotted sleeve being adapted to clamp an inserted member, said sleeves being provided with engaging screw threads, the slopes of the threads receiving the thrust of the sleeves as the sleeves are screwed together having less inclination to the axis than to a perpendicular to the axis, said sleeves having engaging abutments limiting the relative axial movement of the sleeves to create a thrust relation on the threads.

2. In a connecter, the combination of a body sleeve; and a slotted sleeve in the body sleeve adapted to clamp an inserted member, said sleeves having screw threads of inverted buttress form, the inclined slopes of the threads receiving the thrust as the sleeves are screwed together, said sleeves having engaging abutments limiting the relative axial movement of the sleeves to create a thrust relation on the threads.

3. In a connecter, the combination of a body sleeve; a slotted sleeve in the body sleeve adapted to clamp an inserted member, said sleeves being provided with engaging screw threads, the slopes of the threads receiving the thrust as the sleeves are screwed together having less inclination to the axis than to a perpendicular to the axis, said sleeves having engaging abutments limiting the relative axial movement of the sleeves to create a thrust relation on the threads; and means on the slotted sleeve adapted to turn it.

4. In a connecter, the combination of a body sleeve; a slotted sleeve in the body sleeve adapted to clamp an inserted member, said sleeves being provided with engaging screw threads, the slopes of the threads receiving the thrust as the sleeves are screwed together having less inclination to the axis than to a perpendicular to the axis, said sleeves having engaging abutments limiting the relative axial movement of the sleeves to create a thrust relation on the threads; and means acting on the slotted sleeve adapted to turn it, said means comprising a screw.

5. In a connecter, the combination of a body sleeve; a slotted sleeve in the body sleeve adapted to clamp an inserted member, said sleeves being provided with engaging screw threads, the slopes of the threads receiving the thrust as the sleeves are screwed together having less inclination to the axis than to a perpendicular to the axis, said sleeves having engaging abutments limiting the relative axial movement of the sleeves to create a thrust relation on the threads; an ear on the slotted sleeve; an ear on the body sleeve; and a screw between the ears.

6. In a connecter, the combination of a body sleeve; and a slotted sleeve in the body sleeve, said slotted sleeve being adapted to clamp an inserted member, said sleeves being provided with engaging screw threads providing wedging surfaces adapted through their thrust to contract the slotted sleeve, said sleeves having engaging abutments limiting the relative axial movement of the sleeves to create a thrust relation on the threads.

In testimony whereof I have hereunto set my hand.

GEORGE R. METCALF, Jr.